March 8, 1927.
A. A. GIBSON
1,620,540
REGULATOR FOR MERCURY GAUGES
Filed Nov. 1, 1923
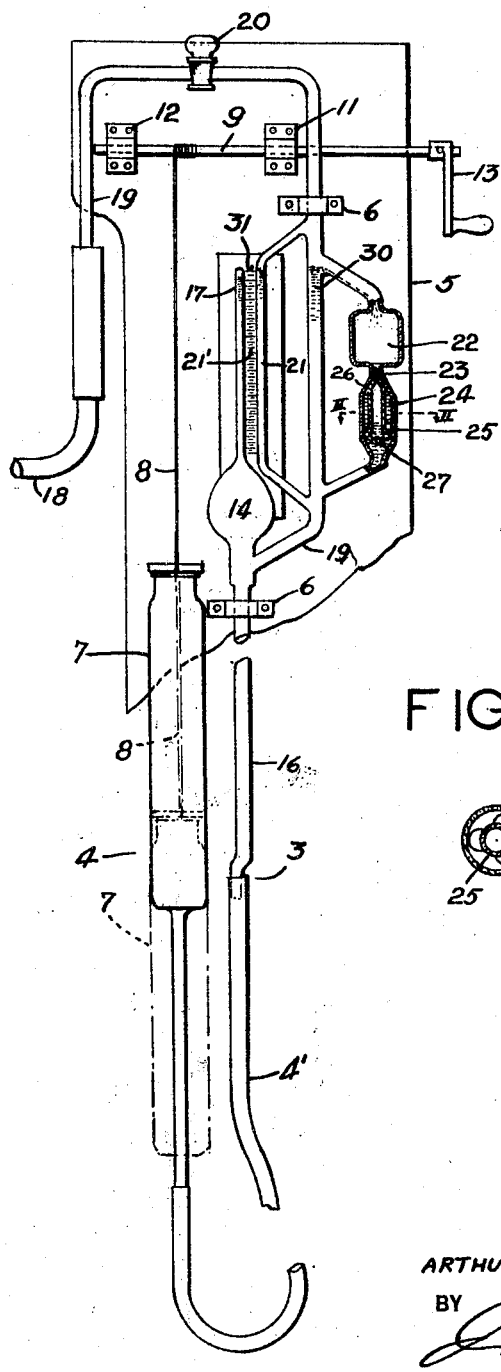
FIG.1.
FIG.2.
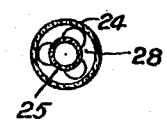
INVENTOR
ARTHUR A. GIBSON
BY
ATTORNEY Patented Mar. 8, 1927.

1,620,540

UNITED STATES PATENT OFFICE.

ARTHUR ANDREW GIBSON, OF BLOOMFIELD, NEW JERSEY, ASSIGNOR TO WESTINGHOUSE LAMP COMPANY, A CORPORATION OF PENNSYLVANIA.

REGULATOR FOR MERCURY GAUGES.

Application filed November 1, 1923. Serial No. 672,228.

This invention relates to gauges employed for the measurement of high vacuum.

An object of the invention is to provide means to facilitate the gauge reading.

Another object of the invention is to provide means for maintaining a mercury column at a constant level for convenient comparison with another column.

A further object of the invention is to provide a standard vacuum gauge with a supplemental chamber to receive an overflow of mercury to maintain a column at a substantially uniform level.

Other objects and advantages of the invention will be apparent as the description proceeds.

It is well known, that when taking a reading from a vacuum gauge of the McLeod type, for example, considerable difficulty is encountered to maintain the column of mercury in the capillary by-pass at a constant level. Variations in the position of this level make it difficult to obtain a reading from the calibrated scale.

The present invention provides such gauges with a supplemental chamber to receive an overflow of mercury from the main column of the gauge and provides a valve controlled return passage to the mercury supply.

For the purpose of illustration, the present invention is shown applied to a McLeod vacuum gauge of 1 to 400 ratio. The invention may, however, be employed in connection with various types of gauges. Gauges of the above character may be used to determine accurately, the degree of vacuum obtained with various exhausting devices. For instance, it may be desirable to ascertain the degree of vacuum obtained by a pump employed for exhausting electric incandescent lamps.

The invention will be more fully understood by reference to the accompanying drawings in which—

Fig. 1 shows the present invention applied to a vacuum gauge, certain portions being broken away, and Fig. 2 is an enlarged view taken on line II—II in Fig. 1.

A gauge having an embodiment of the present invention associated therewith may comprise a U-tube having arms 3 and 4 connected by a flexible tube 4' and supported on a frame or structure 5 upon which the gauge system may be secured by strips 6. The gauge as shown, may include a mercury reservoir 7 associated with the arm 4 and attached to one end of a cable 8, the opposite end of the cable being secured to a shaft 9 rotatable in bearings 11 and 12. A crank 13 may be provided on a projecting end of the shaft for manual rotation thereof. A rotation of the shaft will, therefore, effect an upward or downward movement of the reservoir 7.

The reservoir 7 is connected to a compression chamber 14 through the flexible tube 4' and rigid tubular portion 16. The upper portion 17 of the compression chamber may be formed to constitute a capillary tube of the proper reduced diameter to give the ratio of compression desired, and connection between the compression chamber 14 and a vacuum line 18 is had by means of a main mercury supply tube 19 which, with the tubular portion 16, may be considered as the arm 3 of the U-tube. A stop-cock 20 is positioned at a suitable point in the portion 19.

A capillary by-pass 21 of the same gauge as the portion 17 is provided and disposed adjacent the upper end 17 of the compression chamber 14. A scale 21' is properly positioned between the by-pass 21 and the chamber 17 so that a comparative reading may be made.

Adjacent the tube 19 is disposed an overflow chamber 22, connected by an orifice 23 to a supplemental chamber 24 in which is disposed a movable weighted member 25. The member 25 may be in the form of a closed vessel containing a relatively heavy substance such as mercury. A glass vessel has been found satisfactory. The member 25 operates in conjunction with the orifice 23 to constitute a valve; the member 25 having a tapered end 26 adapted to make contact with tapered walls of the chamber 24 to close the orifice 23 when force, by reason of the mercury flow, is applied to the opposite or enlarged end 27 of the member 25.

The end 27 of the member 25 (see Fig. 2) may be provided with several circumferentially disposed slots 28 to permit the passage of mercury downwardly when the valve is open or when the member 25 is in a lower position.

When it is desired to ascertain the degree of vacuum obtained by a given pumping apparatus, the gauge is connected to the vacuum line, the cock 20 being open. The attenuated atmosphere of the line, therefore, occupies the compression member. The mercury reservoir may then be moved upwardly (as shown in Fig. 1) until a mercury level in the capillary tube 21 reaches a predetermined point and the mercury overflows in the form of a small stream into chamber 22. In order to take a reading, the main column of mercury designated by the numeral 30, must be so positioned that the column in the capillary 21 registers at a predetermined point as for instance, at the point 31. When the column in the capillary is properly positioned, the mercury in the compression chamber will compress the gas within the chamber and will have taken a position at a point throughout the length of the tubular portion 17 of the chamber depending upon the degree of vacuum in the line. Heretofore it has been difficult to maintain the mercury in the main column 30 at a constant level and thus hold the mercury in the capillary by-pass 21 at rest.

In the present device, it will be appreciated that the level of the mercury in the tube 19 will remain constant, owing to the fact that at a suitable point it will overflow into the chamber 22, the orifice 23 being closed as shown.

During the upward movement of the reservoir when the mercury moves upwardly in the tube portions 16 and 19, the mercury enters the lower end of the chamber 24 and acts to move the weighted member 25 upwardly and close the orifice 23, thus preventing passage of mercury upwardly and into the chamber 22, the chamber is thus kept vacant for the reception of overflow, as above described.

By reason of the relatively large capacity of the chamber 22, a time interval of considerable length is provided for a reading of the position of the mercury columns with respect to the scale. The reservoir may then be lowered, at which time the weighted member 25 will drop with the receding mercury and any accumulation of mercury in the chamber 22 will return to the main supply.

It will be readily understood, that by reason of the present invention, a reading may be taken in a more convenient and reliable manner and that the present invention may be readily applied to a gauge of standard construction.

Although a preferred embodiment of the invention is shown and described herein, it is obvious that modifications may be made therein without departing from the spirit and scope of my invention as defined by the appended claims.

What is claimed is:

1. A U-tube vacuum gauge one leg of which has a capillary by-pass, a compression chamber, means for moving mercury upwardly in said gauge to a predetermined level, a chamber in communication with said by-pass to receive an over-flow of said mercury for maintaining said mercury at said level for an appreciable time interval.

2. In a U-tube vacuum gauge one leg of which has a compression chamber and a capillary by-pass, a connection between said gauge and vacuum line, means for moving a mercury column within said gauge, a chamber in communication with said by-pass to receive an overflow of said mercury when the same reaches a predetermined height to facilitate the comparative reading between said by-pass and said compression chamber.

3. In a vacuum gauge comprising a U-tube having a compression chamber associated with one arm thereof, a capillary by-pass on said arm, a connection between said arm and a vacuum line, the other arm of the gauge comprising means for moving a mercury column within said first mentioned arm and said by-pass and within said compression chamber and a chamber for receiving an overflow of mercury when said mercury reaches a predetermined height in said first mentioned arm.

4. In a vacuum gauge comprising a U-tube having a compression chamber associated with one arm thereof, a capillary by-pass on said arm and disposed adjacent to said compression chamber, the latter including a capillary extension disposed adjacent to said by-pass, a connection between said arm and a vacuum line, the other arm of the gauge comprising means for moving a mercury column within said first mentioned arm and said by-pass and within said capillary-extension, a chamber for receiving an overflow of mercury and means for preventing an upward flow of mercury into said chamber.

5. In a vacuum gauge comprising a U-tube having a compression chamber associated with one arm thereof, a capillary by-pass on said arm and disposed adjacent to said compression chamber, said compression chamber including a connection between said arm and vacuum line, the other arm of said gauge comprising means for moving a mercury column within said first mentioned arm and said by-pass and within said compression chamber, a supplemental chamber for receiving an overflow of mercury from said by-pass, means for preventing an upward flow of mercury into said chamber from said supplemental chamber and means for effecting a discharge of mercury from said chamber to said arm.

6. A vacuum gauge comprising a U-tube having a compression chamber associated with one arm thereof, a capillary by-pass on said arm and disposed adjacent to said compression chamber, a vacuum line, communication between said line and said arm, the other arm of the gauge being adapted for relative movement with respect to the first mentioned arm for moving a mercury column within said first mentioned arm, said by-pass and said compression chamber, a supplemental chamber to receive an overflow of mercury from said by-pass, a valve associated with said supplemental chamber to prevent an upward flow of mercury therein and means for operating said valve to discharge mercury from said supplemental chamber.

7. In a vacuum gauge comprising a U-tube having a compression chamber associated with one arm thereof, a capillary by-pass on said arm and disposed adjacent to said compression chamber, said compression chamber including a connection between said arm and a vacuum line, a mercury column within said arm, by-pass and compression chamber, an overflow chamber disposed adjacent to said arm to receive an overflow of mercury from said by-pass when the mercury in said arm reaches a predetermined height, a valve associated with said overflow chamber, a supplemental chamber, a movable member in said supplemental chamber, an orifice between said supplemental and overflow chambers, said movable member being adapted for movement upwardly to prevent passage of mercury from one chamber to another and means for moving said member to permit the passage of said mercury.

In testimony whereof, I have hereunto subscribed my name this 30th day of October, 1923.

ARTHUR ANDREW GIBSON.